United States Patent
Park et al.

(10) Patent No.: US 7,788,194 B2
(45) Date of Patent: Aug. 31, 2010

(54) METHOD FOR CONTROLLING GAME CHARACTER

(75) Inventors: Ki Young Park, Daejeon (KR); Hun Joo Lee, Daejeon (KR); Kwang Hyun Shim, Daejeon (KR); Kwang Ho Yang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 711 days.

(21) Appl. No.: 11/690,207

(22) Filed: Mar. 23, 2007

(65) Prior Publication Data

US 2008/0140595 A1    Jun. 12, 2008

(30) Foreign Application Priority Data

Dec. 8, 2006    (KR) .................... 10-2006-0124748

(51) Int. Cl.
    *G06N 5/00*    (2006.01)
(52) U.S. Cl. ................. 706/15; 706/20; 706/25
(58) Field of Classification Search .......... 706/15, 706/25, 31, 20, 45; 348/443
    See application file for complete search history.

(56) References Cited

U.S. PATENT DOCUMENTS 5,161,014 A * 11/1992 Pearson et al. .............. 348/443
5,412,754 A *  5/1995 Le Cun et al. ................ 706/31
5,559,929 A *  9/1996 Wasserman .................. 706/25
6,601,052 B1    7/2003 Lee et al.

OTHER PUBLICATIONS

Grzeszczuk, NeuroAnimator: Fast Neural Network Emulation and Control of Physics-Based Models, Thesis, University of Toronto, 1998, pp. 1-104.*
Myun-Sub, L., et al., "Implementation of Intelligent Characters adapting to Action Pattern of Opponent Characters" 2005. *NutriMedia Co., Ltd.*
Park, K.Y., et al., "Out-of-Vocabulary Rejection based on Selective Attention Model." 2000. *Neural Processing Letters*, vol. 12, pp. 41-48.

* cited by examiner

*Primary Examiner*—Wilbert L Starks, Jr.
(74) *Attorney, Agent, or Firm*—Ladas & Parry LLP

(57) ABSTRACT

A method for controlling a game character is provided. The method includes analyzing a game situation in which a character appears; and controlling a behavior of the character depending on a result of the analyzing. Accordingly, situation recognition and behavior control depending on the recognized situation are simultaneously performed using the same algorithm, so that the calculation amount can be reduced, and thus high artificial intelligence can be implemented with less computer resources. Also, a game developer does not need to implement individual behavior rules of characters depending on game situations since a situation of the game may be recognized through learning of an artificial neural network using a game database of game situations, and thus the behavior of characters can be controlled depending on the recognized situation.

22 Claims, 3 Drawing Sheets

METHOD FOR CONTROLLING GAME CHARACTER

BACKGROUND OF THE INVENTION

1. Field of the Invention

The present invention relates to a method for controlling a game character, and more particularly, to a method for recognizing a character position in each mode of a game and determining a character position in the next mode. In addition, the present invention relates to a method for automatically recognizing a current game situation of a game such as a group sports game, a strategy/simulation game, and a casual game where a computer controls one or more game characters, and character positions play a crucial role in the game, and controlling behaviors of the individual characters on the basis of the recognized game situation.

2. Description of the Related Art

In the case of a soccer game, game situations include (1) a normal offense situation, (2) a shoot chance situation, (3) a normal defense situation, (4) a situation where an opponent is about to gain a point. The situations may be defined arbitrarily by a user and be mapped to each output node.

To play the aforementioned game, data of each independent characters is prepared. If a user cannot prepare character data, then a character already prepared in a game program is used. In this case, the problem is that characters prepared in the game program are limited, and can hardly catch up with changes of the game. To solve this problem, there have been attempts to use an artificial intelligence technology in forming a game character. The artificial intelligence in a computer game makes characters of the game look like real people, and thus a user can be more absorbed in the game.

The attempts to use the artificial intelligence technology to form game characters include a finite state machine (FSM), a fuzzy state machine (FuSM), and artificial life (Alife).

The Alife is a field of study that examines general characteristics of life through simulations using artificial medium such as computers or robots. The Alife compliments the traditional analytic approach of biology on biological phenomena with a synthetic approach. Although game developers have tried to apply the Alife technology to a game for a long time, the Alife technology was only limitedly applied to the field of game because of its unpredictability. Recently, an attempt to apply the Alife to games has been increasingly made because once basic characteristics of the Alife including flexibility and creativity are applied to a game, the game can be more interesting because of the flexibility to a complex environment and user's manipulation, or an unexpected creative behavior. However, the study for the Alife application in the game field is focused on mapping out overall strategy of a game where characters are clustered, and still remains at a basic level.

The FSM is a rule-based system, which is being most widely used. In the FSM, a finite number of states are connected in a graph controlled by transition between states. Since the FSM can be implemented with just 'if-else' or 'switch-case' statements, the FSM is widely used and can be easily understood and implemented as a program. For example, when finding an opponent in a moving state, a character transits the moving state to a chase state to chase the opponent. Once the opponent enters a predetermined distance, the characters transits the state to an attack state to attack the opponent. Hence, as mentioned above, the FSM is advantageous in that its implementation is easy and an behavior of a character can be easily defined. However, the FSM has disadvantages in that if a game of an opponent employs the FSM, a user may easily predict a game play pattern of the opponent after a predetermined time since the game begun. The predictability lowers an interest in game. To overcome the disadvantages, the FuSM is used.

In the case of the FuSM integrating the FSM with a fuzzy theory, a fuzzy function is applied to input and output values to allow random operations to a certain extent. The randomness makes it difficult for the user to predict a behavior of an opponent since there are possibilities for the opponent to take different behaviors under the same circumstance. However, the implementation of the FSM and the FuSM is easy only when the number of character states is small. If the number of states increases, organizing state diagrams becomes difficult, and a program becomes rapidly complicated. Also, to add a new behavior pattern, both FSM and FuSM must be undesirably newly programmed.

As mentioned above, the conventional artificial intelligence technology is mostly for games such as a board game that requires recognition of an control over an entire game situation. Hence, a game developer must previously define and design every situation and perform coding for every situation. Also, the game designed in such a manner must be coded again whenever a situation or a game rule is changed, because of its inability to recognize and adapt to a new environment. Moreover, the complicated artificial intelligence technology such as the Alife cannot be easily used for an actual game because of its excessively large calculation amount.

SUMMARY OF THE INVENTION

Accordingly, the present invention is directed to a method for controlling a game character, which substantially obviates one or more problems due to limitations and disadvantages of the related art.

It is an object of the present invention to provide a method for controlling a game character so that a character makes a different behavior in each situation by recognizing a current game situation. Conventionally, such situation recognition could be implemented by a rule-based artificial intelligence technology, and a neural network-based artificial intelligence technology could not be applied to an actual game due to its complexity in implementation.

It is another object of the present invention to provide a method for controlling a game character, which can reduce a calculation amount by simultaneously performing situation recognition and behavior control depending on the recognized situation using the same algorithm, and thus allow implementation of high-level artificial intelligence with less computer resources.

It is a further another object of the present invention to provide a method for controlling a game character, which allows recognition of a game situation through learning of a neural network using a game database according to a situation, and also allows control a behavior of a character on the basis of the recognized game situation, without implementing individual behavior rules of the character according to the game situation.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a method for controlling a game character, the method including the steps of: analyzing a game situation in which a character appears; and controlling a behavior of the character depending on a result of the analyzing.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention, are incorporated in and constitute a part of this application, illustrate embodiments of the invention and together with the description serve to explain the principle of the invention. In the drawings.

DETAILED DESCRIPTION OF THE INVENTION

Figure 1:
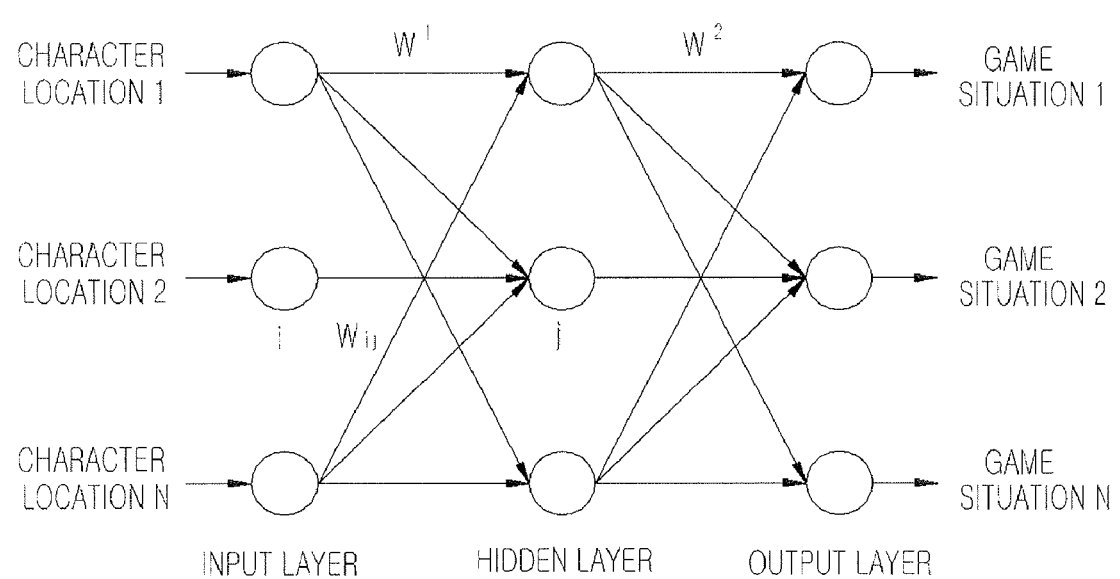
FIG. 1 schematically illustrates a behavior control algorithm of an artificial intelligence character using an artificial neural network of a multilayer perceptron type.

Reference will now be made in detail to the preferred embodiments of the present invention, examples of which are illustrated in the accompanying drawings.

For convenience of description, the same names and symbols are used to refer to the same elements as the related art and their detailed description will be omitted.

According to the present invention, a multilayer perceptron (MLP) is used to game-situation recognition and character control. The multilayer perceptron has an input valve and an output valve of a predetermined dimension. An output layer of the multilayer perceptron is one-to-one mapped to a kind of a game situation to be recognized, and a game situation corresponding to a node outputting a maximum value among output nodes is recognized as a current game situation.

A current character position is applied as a vector to an input layer of the multilayer perceptron. If N characters exist in a game, and each character position is $(x_i, y_i)$, the number of input nodes is 2N, and the input vector is given as $(x_i, y_i, \ldots, x_n, y_n)$. Game play information is also connected to the input layer, besides the actual character position, and any information required for the recognition of the game situation may be provided. For example, in the case of a soccer game, the input vector may include a position of a ball, as well as a position of each player.

The number of nodes of an intermediate layer (hidden layer) may be arbitrarily set, and the number of nodes is optimized by a plurality of experiments since the number of nodes affect recognition and control performance.

Once each node is defined, a process of learning a synapse weight connecting nodes is required. To this end, a user prepares a database suitable for a predefined game situation, and applies suitable input and output values for each situation, so that a weight value of a multilayer perceptron can be learned.

An existing error back propagation algorithm is used for a learning process, and this process will be described later.

When the multilayer perceptron is sufficiently learned by various databases, a situation can be recognized during an actual game, and a position to which a character is to move can be obtained on the basis of the recognized situation. The game situation can be easily recognized by applying a current situation of a character to the input layer and examining which node of the output layer outputs the largest value.

Behavior control of a game character is performed using an extended error back propagation algorithm, a learning algorithm of a multilayer perceptron. A learning algorithm has been proposed in an earlier patent of the present inventor. In the proposed algorithm, a pattern at an input layer is learned by extending the error back propagation algorithm up to an input layer, unlike an existing error back propagation algorithm in which an error is back-propagated only up to a hidden layer to learn only weights connecting an input layer and the hidden layer, and the hidden layer and an output layer. In the present invention, it is determined which direction characters must move while minimizing an error at an output layer using the afore-mentioned learning algorithm.

To determine character movements in each frame, the following processes are repetitively performed using a learning algorithm of an input layer; calculating a movement direction of each character, controlling a character position on the basis of the calculated movement direction, and then recognizing a situation again.

According to the present invention, a multilayer perceptron and an extended error back propagation algorithm of the multilayer perceptron are employed to recognize a game situation, and control character movements of the game on the basis of the recognized situation.

Figure 2:
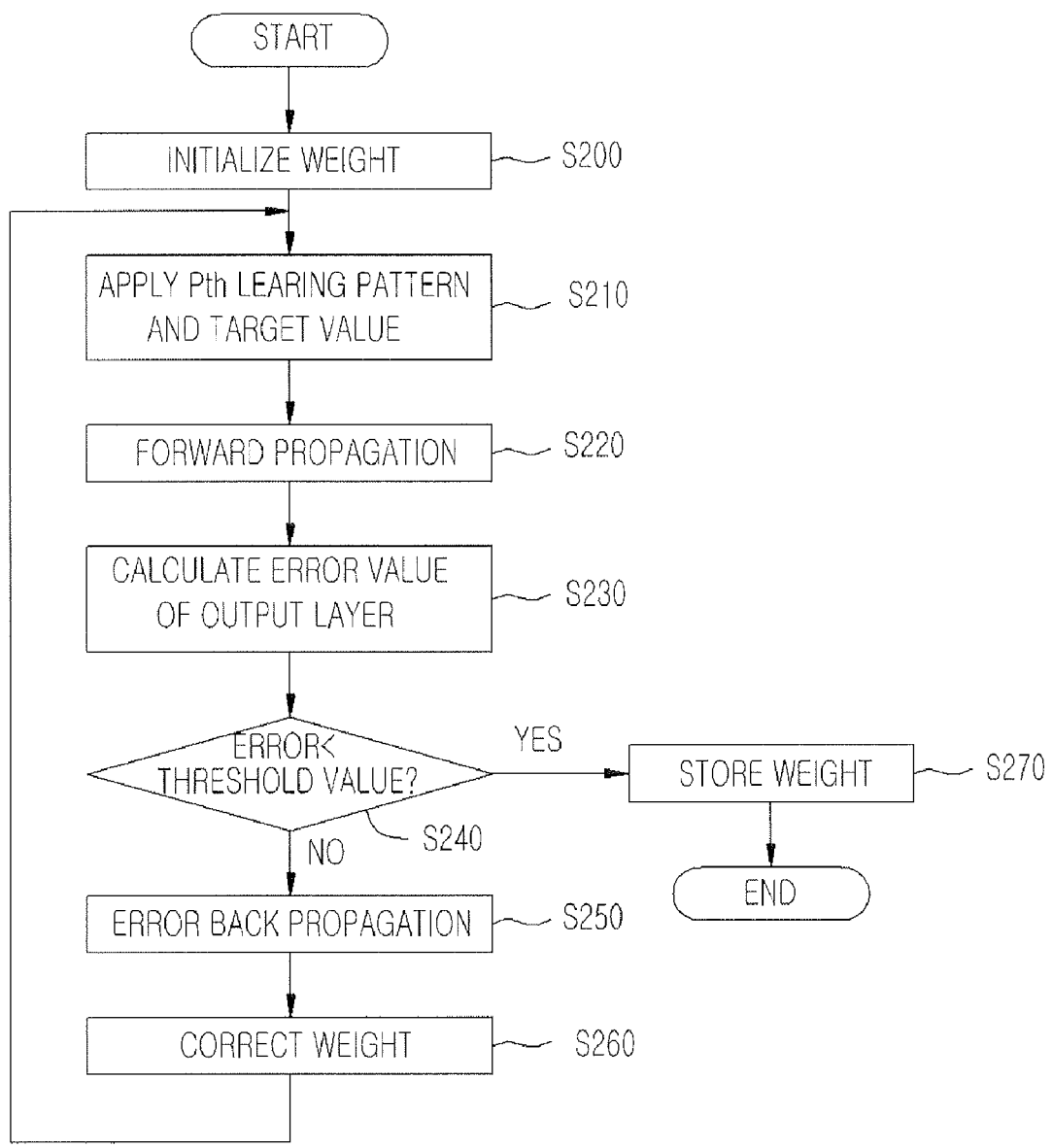
FIG. 2 is a flowchart of a learning method of a multilayer perceptron according to an embodiment of the present invention.

FIG. 1 schematically illustrates a behavior control algorithm of an artificial intelligence character using an artificial neural network of a multilayer perceptron type, and FIG. 2 is a flowchart illustrating a learning algorithm of a multilayer perceptron according to an embodiment of the present invention.

As illustrated in FIG. 1, a multilayer perceptron is a neural network with a layered structure where at least one intermediate layer (hidden layer) exists between an input layer and an output layer, and is formed by connecting a plurality of single-layer perceptrons in series. An input value applied to the input layer is multiplied with a synapse weight of a synapse connecting input neurons, a weighted sum is computed for each neuron of an adjacent hidden layer, and an output of the neuron is input to the next hidden layer. In this manner, the input value of the input layer is transferred up to the output layer in order. Here, an input of a $j^{th}$ neuron of an $l^{th}$ hidden layer is calculated using Equation 1 below.

$$\hat{h}_j^l = w_{j0}^l + \sum_{k=1}^{N} w_{jk}^l h_k^{l-1} = \sum_{i=0}^{N} w_{jk}^l h_k^{l-1} \qquad \text{Equation 1}$$

In Equation 1, $w_{o^l}^l$ denotes the 'bias' of $\hat{h}_j^l$, $h_o^{l-1}=1$. $w_{jk}^l$ denotes a synapse weight connecting a $k^{th}$ neuron of an $l-1^{th}$ hidden layer with the $j^{th}$ neuron of the $l^{th}$ hidden layer, $h_k^{l-1}$ denotes an output value of the $k^{th}$ neuron of the $l-1^{th}$ hidden layer, and N denotes the number of hidden neurons of the hidden layer.

If the neuron input of the hidden layer is given as $\hat{h}_j^l$, an output value of the neuron is calculated using Equation 2 below.

$$h_j^1 = f(\hat{h}_j^1) = \frac{2}{1 + \exp(-\hat{h}_j^1)} - 1 \quad \text{Equation 2}$$

In order for the multilayer perceptron having such a structure to normally operate as a recognizer, synapse weights connecting neurons must be appropriately controlled. A control process of the synapse weights is a learning process of the multilayer perceptron, and the calculation for the synapse weight control is performed for each layer using an error back propagation algorithm.

Learning of the multilayer perceptron includes receiving p learning patterns as inputs, setting a desired output value corresponding to each learning pattern as a target value of an output layer, and calculating a synapse weight that minimizes a mean squared error (MSE) between an actual output value and the target value. The target value indicates a desired output value of data used for the learning. The learning algorithm using the target value is called a supervised learning algorithm.

Referring to FIG. 2, a weight is initialized in operation S200. A $p^{th}$ learning pattern and a target value are applied in operation S210, and then forward propagation of the $p^{th}$ learning pattern and the target value is performed in operation S220. Then, an error value of an output layer is calculated in operation S230. If the calculated error value is smaller than a threshold value, the weight is stored in operation S270. However, if not, error back propagation is performed in operation S250, and thus the weight is corrected in operation S260.

The specific description of the above-described process is as follows. The MSE with respect to the p learning pattern $x^p$, the following output vector $y^p$, and the target vector $t^p$ is calculated using Equation 3 below.

$$E = \frac{1}{2} \sum_{p=1}^{N} \|t^p - y^p\|^2 \quad \text{Equation 3}$$

In the error back propagation algorithm, the weight of the output layer is repetitively applied using Equation 4 below to minimize the MSE of Equation 3.

$$w_{ij(new)}^l = w_{ij(old)}^l + \eta \delta_j^l h_i^{l-1} \quad \text{Equation 4}$$

In Equation 4, $\eta$ denotes a learning rate, and $\delta_i^l$ is the term indicating a differential value of an error of the output layer with respect to each neuron value of the hidden layer, and is defined using Equation 5 below.

$$\delta_i^L = (t_i - y_i) f'(\hat{y}_i), \; i \in \text{output layer} \quad \text{Equation 5}$$
$$\delta_j^1 = f'(\hat{h}_j^1) \sum_i \delta_i^{l+1} w_{ij}^{l+1}, \; j \in \text{hidden layer}$$

To sum up, the error back propagation algorithm is an algorithm that repetitively applies for p learning patterns, processes of calculating a total error value of the output layer using Equation 3 through the forward propagation of Equation 1 with respect to the given input vector and the target vector, differentiating the error value of the output layer with respect to each neuron value of the hidden layer using Equation 5 to minimize the error value, and changing the synapse weight using Equation 4. FIG. 2 schematically illustrates those processes.

Therefore, as the traditional error back propagation algorithm is developed to extend the learning algorithm up to the input layer, better recognition performance can be achieved. When the error propagation algorithm is extended up to the input layer with respect to Equation 5, the term $\delta$ at the input layer becomes as shown in Equation 6 below.

$$\delta_k^0 = -\frac{dE}{dx_k} \quad \text{Equation 6}$$

That is, Equation 6 shows a direction in which the input value is changed in order to minimize an error of the output layer. Here, $\delta_k^o$ can be easily obtained by extending the existing error back propagation algorithm using Equation 7 below.

$$\delta_k^0 = \sum_j w_{jk}^1 \delta_j^1 \quad \text{Equation 7}$$

In Equation 7, $\delta_k^o$ refers to the term $\delta$ of the $j^{th}$ neuron of the first hidden layer like in the existing error back propagation algorithm.

Figure 3:
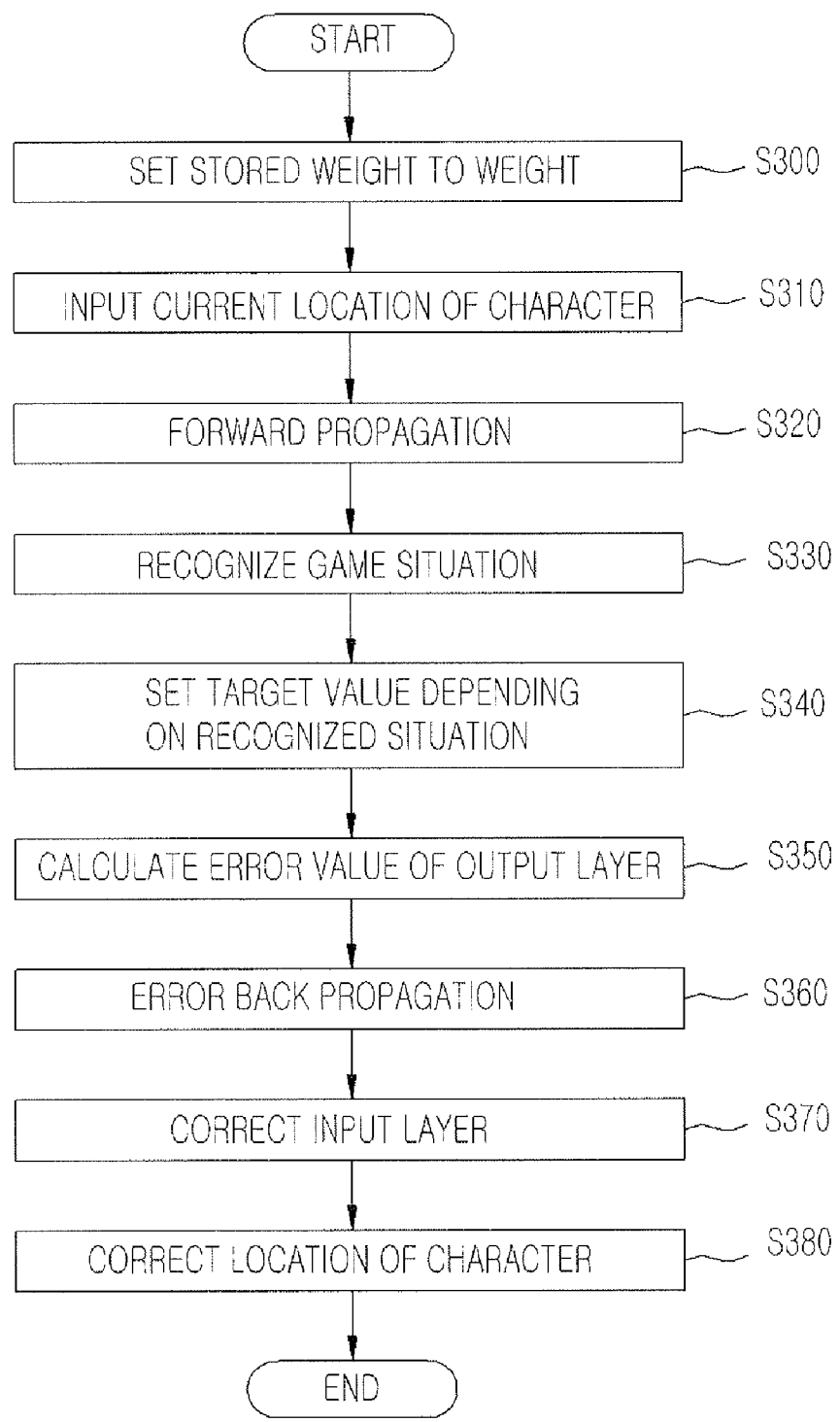
FIG. 3 is a flowchart of a method for recognizing a situation using a multilayer perceptron and controlling a character position on the basis of the recognized situation according to an embodiment of the present invention.

FIG. 3 is a flowchart of a method for recognizing a situation using a multilayer perception and controlling a character position on the basis of the recognized situation according to an embodiment of the present invention. Referring to FIG. 3, a process of learning a database with respect to various perceptrons in a method for controlling a game character according to an embodiment the present invention will be described.

In operation S300, a weight is initialized to a previously-stored weight. Data including a current position of a character is input in operation S310, and then forward propagation of the data is performed in operation S320. Here, an input layer of a multilayer perceptron is connected to current game information, and any data may be the current game data provided that it is necessary to recognize a game situation. For example, in the case of a soccer game, data of positions of each player and a ball is supplied to each input node. On the assumption that there are n characters that are moving in a game, and a current position of an $i^{th}$ character is $(x_i, y_i)$, a value of the input layer is defined as Equation 8 below.

$$x = (x_1, y_1, \ldots, x_N, y_N) \quad \text{Equation 8}$$

The number of nodes of the intermediate layer (hidden layer) may be arbitrarily set by a user. Here, the number of nodes is optimized by a plurality of experiments since the number of nodes affect recognition and control performance.

Once each node is defined, a process of learning a synapse weight connecting nodes is required. To this end, a user prepares a database suitable for a predefined game situation, and applies suitable input and output values for each situation, so that a weight value of a multilayer perceptron can be learned. The learning process will now be described.

First, a game situation is recognized in operation S330. Specifically, data of the database is applied as an input value. Here, the data must include information about a situation, and a target value of an output mode is set on the basis of the information in operation S340. The target value of the output mode is set to 1 in the case of a node corresponding to a situation of the data, and to 0 (or –1) in the case of other nodes.

$$t = \{0, \ldots, 1, \ldots, 0\} \quad \text{Equation 9}$$

When the input value and the target value are determined, a weight is learned such that an output value corresponding to the input value becomes identical to the target value. The target value is calculated using Equations 1 and 2, and the learning of the weight is calculated using Equations 4 and 5 to minimize the MSE of Equation 3. The weight is learned by repeating the above-mentioned process with respect to sufficiently many databases. That is, an error value of the output layer is calculated in operation S350, and the weight is corrected by the error back propagation algorithm to minimize the error in operation S360.

When the weight is learned, a real-time game can be played, and thus a current game situation can be determined. The process may be easily realized by applying data corresponding to a current game situation as an input value, calculating an output value using Equations 1 and 2, and then selecting a situation corresponding to a node outputting a maximum value. When a situation is recognized, a character position in the next frame is calculated on the basis of the current situation, and this process is performed as follows.

First, a target value corresponding to a recognized current situation is set. A method of setting a target value is the same as described above. That is, the target value is set to 1 for a node corresponding to the recognized situation, and to 0 (or −1) for other nodes. Thereafter, an error value between a current output value and the set target value is calculated using Equation 3. Then, new character positions in the next frame may be calculated by correcting the character positions in such a way that the error value is minimized. That is, the input layer is corrected in operation S370 and thus the character positions are corrected in operation S380.

$$\Delta x = -\eta \frac{dE}{dx} \quad \text{Equation 10}$$

In Equation 10, x denotes a vector of an input node value, E denotes an error value calculated at the output layer, and η denotes a constant indicating an extent to which a weight is learned. Consequently, Equation 10 indicates a direction in which input values are to be changed for an output value corresponding to the current situation. In order to efficiently calculate the value of Equation 10, $\delta_I^0$ of the input layer is calculated using Equation 8, and thus Equation 10 may be calculated using Equation 11 below.

$$\Delta x = -\eta \sum_j w_{jk}^1 \delta_j^1 \quad \text{Equation 11}$$

The new character positions may be calculated by Equation 11.

$$x^{new} = x^{old} + \Delta x \quad \text{Equation 12}$$

Equation 12 is for directly calculating a character position in the next frame from the current position in a current frame. In general, besides such direct calculation, a character position in the next frame for a character movement in a game may be calculated indirectly by designating a velocity of the character.

$$v = \frac{x^{new} - x^{old}}{\Delta t} = \frac{\Delta x}{T} \quad \text{Equation 13}$$

In Equation 13, T denotes an interval between times at which a position is calculated, That is, a frame interval, and Δx denotes a variation of a position, and may be calculated using Equation 11.

Also, the character position may be designated by the magnitude and direction of a force being applied to a character, besides the direct position designation and the position designation using the velocity. Particularly, the velocity and position of the character may be calculated by setting a force being applied to the character, so that physical movements can be obtained, which is similar to those in a real world.

$$F = F \times d \quad \text{Equation 14}$$

In Equation 14, F denotes a force as a vector value having a direction and a magnitude, and F denotes a magnitude of a force which a character can make to change its position, and is determined in a real game by a physical property, and a current physical strength of the character. In Equation 14, d denotes a unit vector indicating a direction in which the power is applied, and may be calculated using Equation 15.

$$d = \frac{\Delta x}{\|\Delta x\|} \quad \text{Equation 15}$$

In Equation 15, $\|\cdot\|$ is a sign for calculating the magnitude of a vector. If the character position is determined in the aforementioned manner, an effect of avoiding influence of the magnitude of η of Equation 11 on the character position may be achieved together. The method of calculating the velocity or the next character position using Equation 14 may vary depending on a physical engine used in a game, and may be calculated using, for example, Equation 16.

$$a = \frac{F}{m} \quad \text{Equation 16}$$
$$v^{new} = v^{old} + a\Delta t$$
$$x^{new} = x^{old} + v^{old}\Delta t + \frac{1}{2}a\Delta t^2$$

When a new character position is calculated, a game is played according to the new character position, and the new character position is applied to the multilayer perceptron as an input value, thereby repeating the above-described processes.

Effects of the game character control method according to embodiments of the present invention will now be described.

Since a current game situation is recognized and thus a character can be controlled to do a different behavior in each situation, a game can be implemented more realistically.

The situation recognition and the behavior control depending on the recognized situation are simultaneously performed using the same algorithm, so that the calculation amount can be reduced, and thus high artificial intelligence can be implemented with less computer resources.

According to the present invention, a game developer does not need to implement individual behavior rules of characters depending on game situations. That is, according to the present invention, a situation of the game may be recognized through learning of an artificial neural network using a game database of game situations, and thus the behavior of characters can be controlled depending on the recognized situation. Therefore, the game developer can develop a high-quality game with less development costs.

It well be apparent to those skilled in the art that various modifications and variations can be made in the present invention. Thus, it is intended that the present invention covers the modifications and variations of this invention provided they come within the scope of the appended claims and their equivalents.

What is claimed is:

1. A method for controlling a game character, the method comprising the steps of:
   analyzing a game situation in which a character appears on a computer; and
   controlling a behavior of the character depending on a result of the analyzing,
   wherein the steps of analyzing and controlling are performed using a multilayer perceptron,
   wherein in the multilayer perceptron, an output value according to an input value is previously learned by a supervised learning method, and then the behavior of the character is controlled,
   wherein in the supervised learning method, a weight of an output layer is determined to minimize an mean squared error (MSE),
   wherein the weight of the output layer is calculated using the following equation:

$$w_{ij(new)}{}^{l} = w_{ij(old)}{}^{l} + \eta \delta_j^l h_i^{l-1}$$

where $w_{ij}{}^{l}$ denotes a weight of the output layer, $\eta$ denotes a learning rate, and $\delta_i^l$ denotes a differential value of an error of the output layer with respect to each neuron value of a hidden layer.

2. The method of claim 1, wherein the multilayer perceptron inputs a character position in a current mode at an input layer, calculates at a hidden layer a character position in the next mode on the basis of the character position input to the input layer, and outputs the calculated character position to an output layer.

3. The method of claim 2, wherein the hidden layer calculates the character position in the next mode according to a pattern learned by an error back propagation algorithm.

4. The method of claim 2, wherein the hidden layer includes at least one node connecting the input layer and an arbitrary point of the output layer.

5. The method of claim 2, wherein the input layer, the hidden layer, and the output layer are connected to each other by neurons, the method further comprising the step of calculating synapse weights of synapses connecting the neurons in each layer by an error back propagation algorithm.

6. The method of claim 5, wherein the step of calculating the synapse weights comprises the steps of:
   preparing a database including a character position according to a game mode;
   setting a target value of an output node; and
   calculating the synapse weights so that the target value and the output value become identical.

7. The method of claim 5, further comprising the step of calculating an input value and an output value on the basis of the synapse weights, and calculating a character position in the next mode, when the character position is input in the current mode.

8. The method of claim 7, wherein the step of calculating the character position in the next mode comprises the step of setting a target value, and determining a target value having a minimum difference from the input value as an output value to calculate the character position.

9. The method of claim 8, wherein the character position in the next mode is calculated using the following equation:

$$\Delta x = -\eta \frac{dE}{dx}$$

where x denotes a vector of an input node value, E denotes an error value calculated at the output layer, and $\eta$ denotes a constant indicating an extent to which a weight is learned.

10. The method of claim 9, wherein the vector of the input node value is calculated using the following equation:

$$\Delta x = -\eta \sum_j w_{jk}^1 \delta_j^1.$$

11. The method of claim 10, wherein the character position in the next mode is calculated using the following equation:

$$x^{new} = x^{old} + \Delta x.$$

12. The method of claim 10, wherein the character position in the next mode is calculated using the following equation:

$$v = \frac{x^{new} - x^{old}}{\Delta t} = \frac{\Delta x}{T}.$$

13. The method of claim 10, wherein the character position in the next mode is calculated using the following equations:

$$F = F \times d$$

$$d = \frac{\Delta x}{\|\Delta x\|}$$

where F denotes a force as a vector value having a magnitude and a direction, F denotes a force applied to the character as a scalar value, and d denotes a movement distance of the character as a unit vector representing a direction in which a force is applied.

14. The method of claim 10, wherein the character position in the next mode is calculated using Equation 3 below by calculating an acceleration value of the character in the current mode represented by Equation 1 below, and a velocity of the character in the current mode represented by Equation 2 below:

$$a = \frac{F}{m} \qquad \text{Equation 1}$$

$$v^{new} = v^{old} + a\Delta_t \qquad \text{Equation 2}$$

$$x^{new} = x^{old} + v^{old}\Delta t + \frac{1}{2}a\Delta t^2 \qquad \text{Equation 3}$$

where m denotes a character weight.

15. The method of claim 7, further comprising the steps of:
   moving the character to the character position in the next mode after the calculating of the character position;
   playing the game in the next mode;

analyzing a game situation; and
controlling a behavior of the character on the basis of a result of the analyzing.

16. The method of claim 2, wherein the character position in the next mode is calculated using the following equation:

$$h_j^1 = f(\hat{h}_j^1) = \frac{2}{1+\exp(-\hat{h}_j^1)} - 1.$$

17. The method of claim 1, wherein the differential value of the error of the output layer with respect to each neuron value of the hidden layer is calculated by the following equations:

$$\delta_i^L = (t_i - y_i)f'(\hat{y}_i), \quad i \in \text{output layer}$$

$$\delta_j^1 = -f'(\hat{h}_j^1)\sum_i \delta_i^{l+1} w_{ij}^{l+1}, \quad j \in \text{hidden layer.}$$

18. A method for controlling a game character, the method comprising the steps of:
   initializing a weight using a multilayer perceptron on a computer; and
   inputting and processing a character position in a current mode to correct the weight,
   wherein in the multilayer perceptron, an output value according to an input value is previously learned by a supervised learning method, and then the behavior of the character is controlled,
   wherein in the supervised learning method, a weight of an output layer is determined to minimize an mean squared error (MSE),
   wherein the weight of the output layer is calculated using the following equation:

$$w_{ij(new)}^l = w_{ij(old)}^l + \eta \delta_j^l h_i^{l-1}$$

where $w_\eta^l$ denotes a weight of the output layer, $\eta$ denotes a learning rate, and $\delta_i^l$ denotes a differential value of an error of the output layer with respect to each neuron value of a hidden layer.

19. The method of claim 18, wherein the step of processing comprises the steps of:
   performing forward propagation of the character position and setting a target value; and
   correcting the weight depending on an error value between the target value and an output value.

20. The method of claim 19, wherein the step of correcting the weight is performed according to an error back propagation algorithm.

21. The method of claim 18, further comprising the step of correcting the character position according to the corrected weight.

22. The method of claim 18, wherein the differential value of the error of the output layer with respect to each neuron value of the hidden layer is calculated by the following equations:

$$\delta_i^l = (t_i - y_i)f'(\hat{y}_i), \quad i \in \text{output layer}$$

$$\delta_j^l = -f'(\hat{h}_j^l)\sum \delta_i^{l+1} w_{ij}^{l+1}, \quad j \in \text{hidden layer.}$$

* * * * *